UNITED STATES PATENT OFFICE.

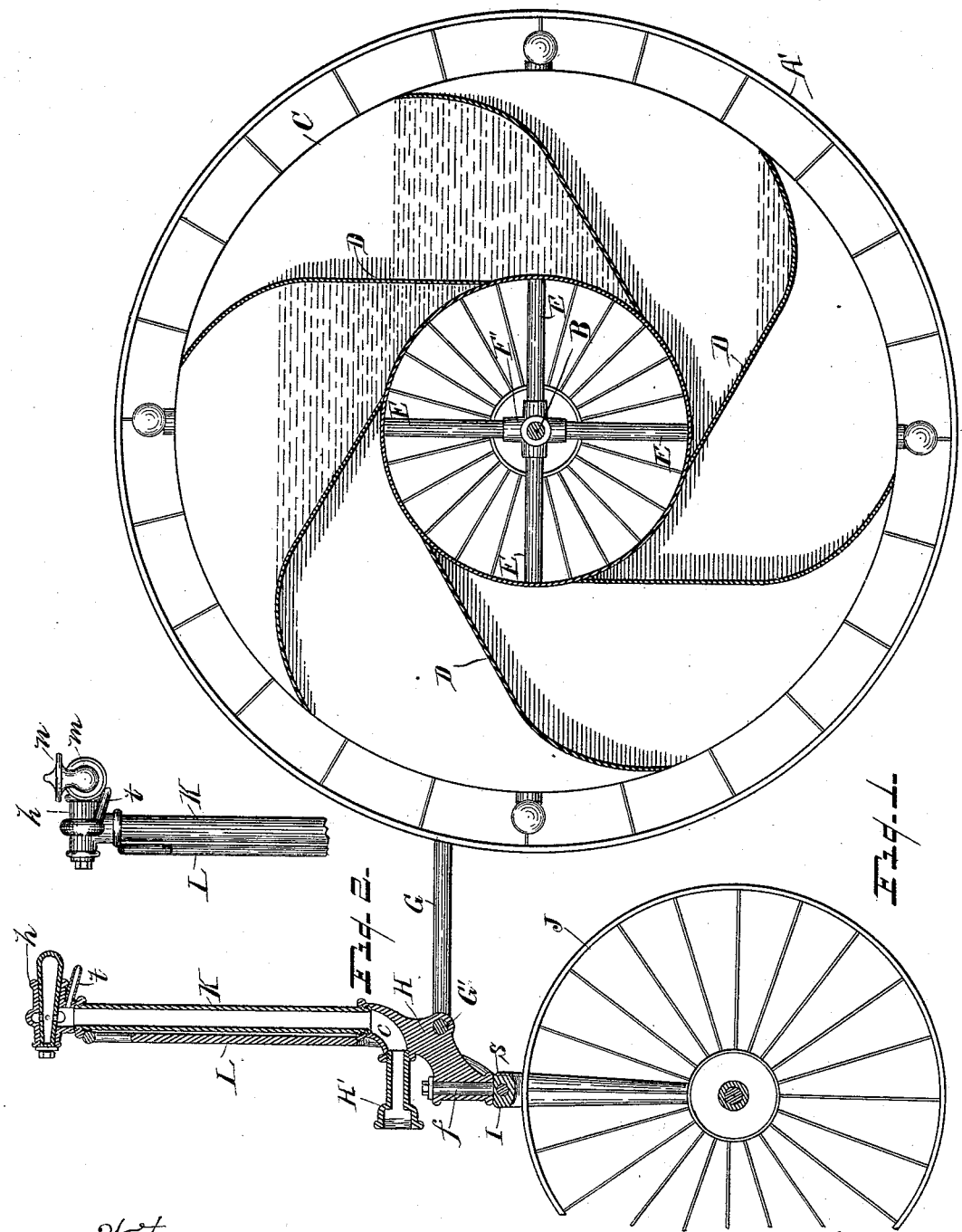

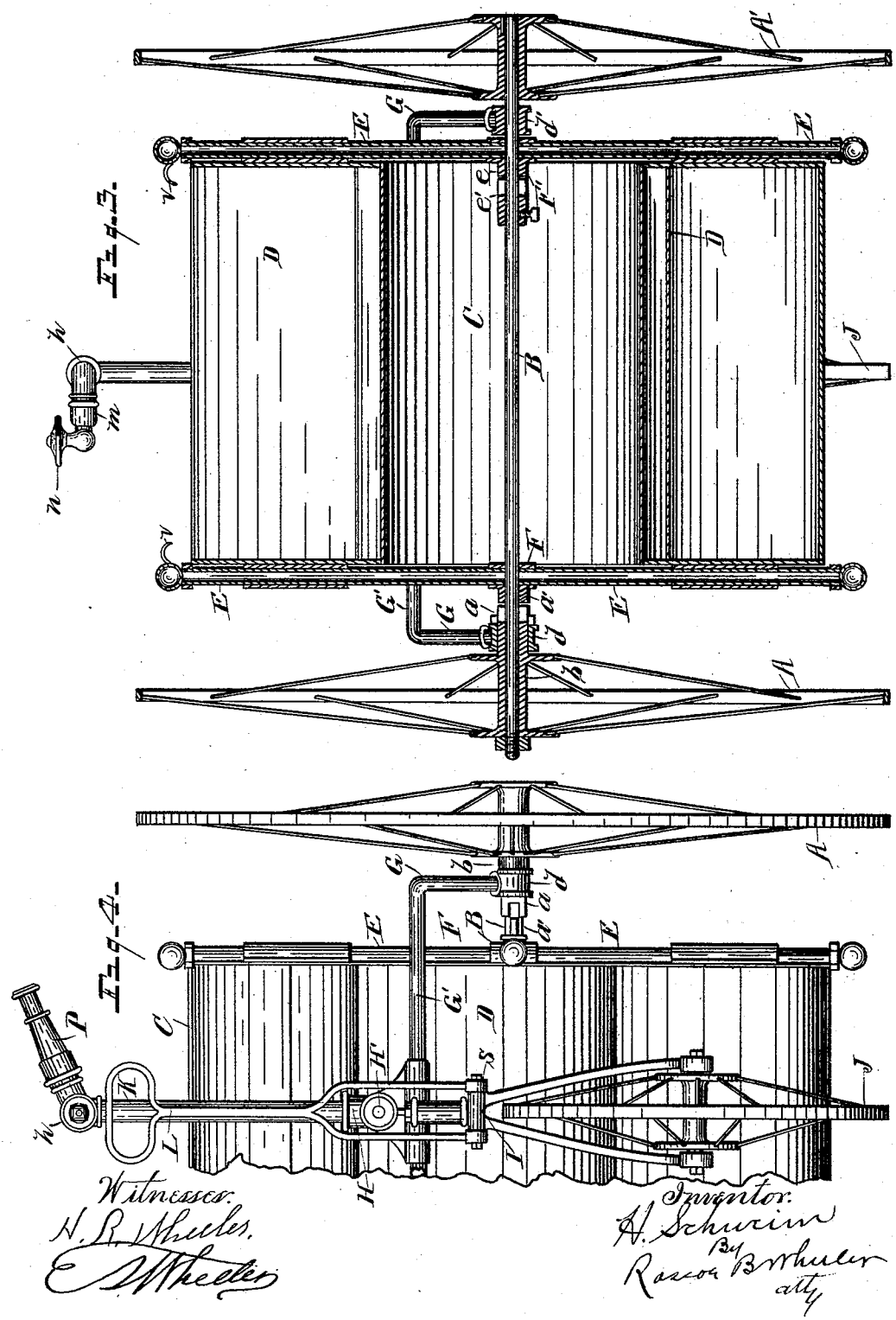

HERMAN SCHWEIM, OF DETROIT, MICHIGAN.

LAWN TRAVERSER AND SPRINKLER.

SPECIFICATION forming part of Letters Patent No. 492,843, dated March 7, 1893.

Application filed November 2, 1891. Serial No. 410,677. (No model.)

*To all whom it may concern:*

Be it known that I, HERMAN SCHWEIM, a citizen of the United States, residing at Detroit, in the county of Wayne and State of Michigan, have invented certain new and useful Improvements in Lawn Traversers and Sprinklers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in automatic lawn sprinklers; and consists in a certain construction and arrangement of parts as hereinafter fully set forth, the essential features of which being pointed out particularly in the claims.

The object of this invention is to provide simple, economic, and effective means for propelling the sprinkling device across the lawn so as to thoroughly sprinkle that portion of the lawn traversed, and a further provision, whereby the device may be employed as a hose reel on which to wind the hose after the sprinkling has been accomplished. This object is attained by the mechanism illustrated in the accompanying drawings, in which:—

Figure 1, is a central longitudinal section through the device. Fig. 2, is a detail in elevation of a portion of the stand pipe having the sprinkler attached thereto. Fig. 3, is a vertical transverse section through the cylinder and rear transporting wheels. Fig. 4, is a front elevation of the device, like portions being broken away.

Referring to the letters of reference, A and A' designate the main transporting wheels which are mounted on the axle B, the wheel A, being loosely mounted on said axle, and the wheel A' tightly secured thereon, as shown in Fig. 2.

C, designates a cylinder loosely mounted on the axle between said wheels, said cylinder has an opening through its longitudinal center, as shown in Fig. 1, and is provided with a series of tangent partitions D, between its closed ends forming radial water buckets extending longitudinally of said cylinder.

E, designates a series of radial arms to which the cylinder is attached at each end and which support the same, the inner ends of said arms being secured in cross-couplings F, F', which are journaled on the axle B, and also adapted to slide thereon.

The hub $b$ of the wheel A extends inward and is provided on its inner end with a clutch $a$ adapted to receive a corresponding part or projection $a'$ extending from the cross-coupling F, of the cylinder or reel. The coupling F', in like manner having an inwardly extending projection $e$, adapted to engage a clutch-collar $e'$, rigidly secured to the axle, as shown in Fig. 3. With this arrangement, by sliding the cylinder to the left, it is locked to the wheel A and to the axle, so that when it revolves the wheels will be turned thereby, and when said cylinder is slid to the right, it is disengaged from the wheel A and the axle, and will revolve freely, as when reeling the hose thereon, permitting also the wheel A and axle to freely turn without causing said cylinder to revolve, as when transporting it from place to place.

Journaled on the inwardly extending end of the hub $b$ of the wheel A, is a collar $d$, to which is attached one end of the angle rod G forming the frame, which extends forward, then crosses at right angles in front of the cylinder, and back to the axle on the opposite side, where it is attached to the collar $d'$ journaled on the axle between the cylinder and the wheel A', as clearly shown in Fig. 3. At the longitudinal center of the right-angle portion G' of said frame, is secured a head H, in which is swiveled the stem $f$, of the fork I between the lower ends of which is mounted the small wheel J that supports the forward end of the frame, as shown in Fig. 1.

Attached to the head H is a stand-pipe K, the lower end of which communicates with a duct $c$, in said head, which in turn, communicates with an extended coupling H' which affords means for attaching the hose thereto. The stand-pipe K is provided at its upper end with a universal-cock $h$ having an elbow tube $m$ to which is attached a rotary sprinkler $n$, as shown in Figs. 1 and 3, communicating with the hollow bead $o$ of the cock or with the interior of the pipe K, is a small tube $t$, that extends rearward in the direction of the cylinder C.

L, designates a handle whose bifurcated end is pivoted at s, to the fork I, and by means of which the apparatus may be drawn.

To employ this improved device for sprinkling a lawn, the cylinder C, is slid upon the axle so as to cause the clutches to engage and lock said cylinder to the hub of the wheel A, and to the axle B, as before described, the hose is then attached to the coupling H', and the device placed in proper position to travel across the lawn to be sprinkled. The water is then turned on which enters the stand-pipe K, and passing through the cock $h$ is discharged from a rotary sprinkler $n$, in an extensive circle. By reason of the tube $t$ communicating with the source of water supply, a jet of water is thrown therefrom, into the buckets in the cylinder C, which, as they become filled with water, as shown in Fig. 1, cause the cylinder to turn and impart motion to the transporting wheels A, A', whereby the device is gradually propelled across the lawn which is thoroughly and evenly sprinkled over the surface traversed, the hose being drawn behind the apparatus as it moves along. When it has reached the limit of its travel the apparatus is turned around and started back in the opposite direction, being so located as to sprinkle over a new area. In this way a long stretch of lawn may be uniformly sprinkled with but little attention.

If desired the sprinkler may be removed and the nozzle P, attached, as shown in Fig. 4, when a solid stream may be thrown in any direction.

To reel the hose upon the cylinder, it is adjusted on the axle to disengage the clutches, when said cylinder will freely revolve, enabling the hose to be reeled thereon, the hooks $v$, shown in Fig. 3. serving to retain the ends of the hose.

Having thus fully set forth my invention, what I claim as new, and desire to secure by Letters Patent, is—

1. In an automatic lawn sprinkler, the combination of the transporting wheels, the revoluble cylinder having water-buckets therein mounted between said wheels, the tube connected with the water supply, adapted to throw a jet of water into the buckets of said cylinder, substantially as set forth.

2. In a lawn traversing and sprinkling device, the combination of the transporting wheels, the revoluble cylinder having water-buckets therein mounted between said wheels, the clutch adapted to connect said cylinder with the transporting wheels, the tube connected with the water supply and adapted to throw a jet of water in to the buckets of the cylinder, as set forth.

3. In a lawn traverser and sprinkler, the combination of the transporting wheels. The revoluble cylinder provided with water buckets said cylinder mounted between and having means of engagement with the transporting wheels, the stand-pipe also mounted on said wheels and carrying a sprinkler, the tube attached to said pipe and adapted to throw a jet of water into the buckets of the cylinder.

4. In a lawn traverser and sprinkler, the combination of the transporting wheels, and axle, the revoluble bucket carrying cylinder mounted on the axle between said wheels and adapted to slide horizontally on said axle and having means of engagement with, and disengagement from, the transporting wheels. The stand-pipe carrying a nozzle or sprinkler and a jet throwing tube, and having means for attaching a hose thereto, substantially as specified.

5. In a lawn traverser and sprinkler, the combination of the frame mounted on transporting wheels, the axle connecting the rear wheels, the bucket carrying cylinder or reel rotatively mounted on said axle between said wheels, and having means of engagement therewith and disengagement therefrom, the stand-pipe mounted on the forward portion of the frame having a swiveled nozzle at its upper end, the tube extending rearwardly from said stand pipe and adapted to throw a jet of water into the buckets of said cylinder or reel, substantially as set forth.

In testimony whereof I affix my signature in presence of two witnesses.

HERMAN SCHWEIM.

Witnesses:
E. S. WHEELER,
H. R. WHEELER.